Jan. 4, 1927.
H. ARMSTRONG
1,613,552
BAG OR SACK COUNTER
Filed August 5, 1925    3 Sheets-Sheet 1
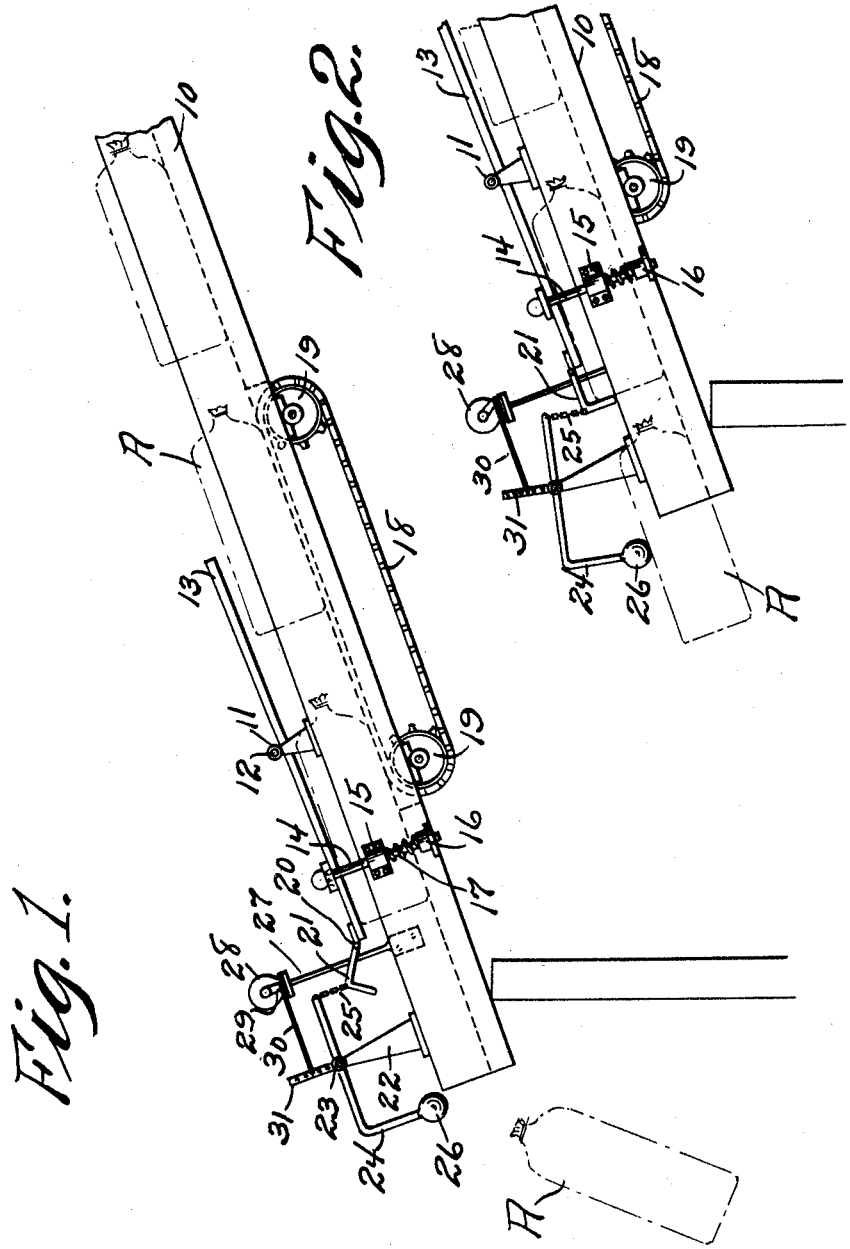
Howard Armstrong
INVENTOR
BY Victor J. Evans
ATTORNEY
WITNESS:

Jan. 4, 1927.
H. ARMSTRONG
BAG OR SACK COUNTER
Filed August 5, 1925
1,613,552
3 Sheets-Sheet 2
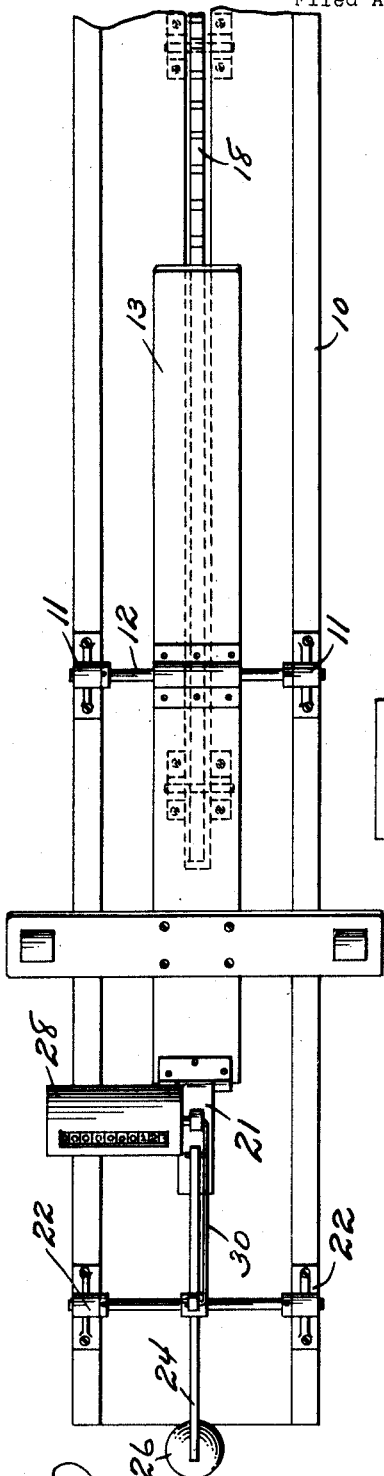
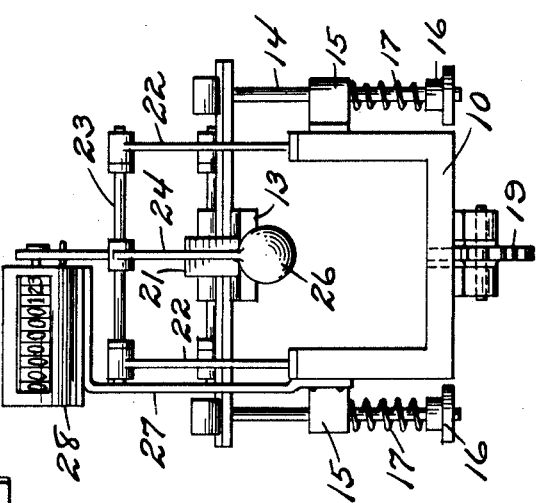
Howard Armstrong
INVENTOR
BY Victor J. Evans
ATTORNEY Jan. 4, 1927.
H. ARMSTRONG
1,613,552
BAG OR SACK COUNTER
Filed August 5, 1925    3 Sheets-Sheet 3
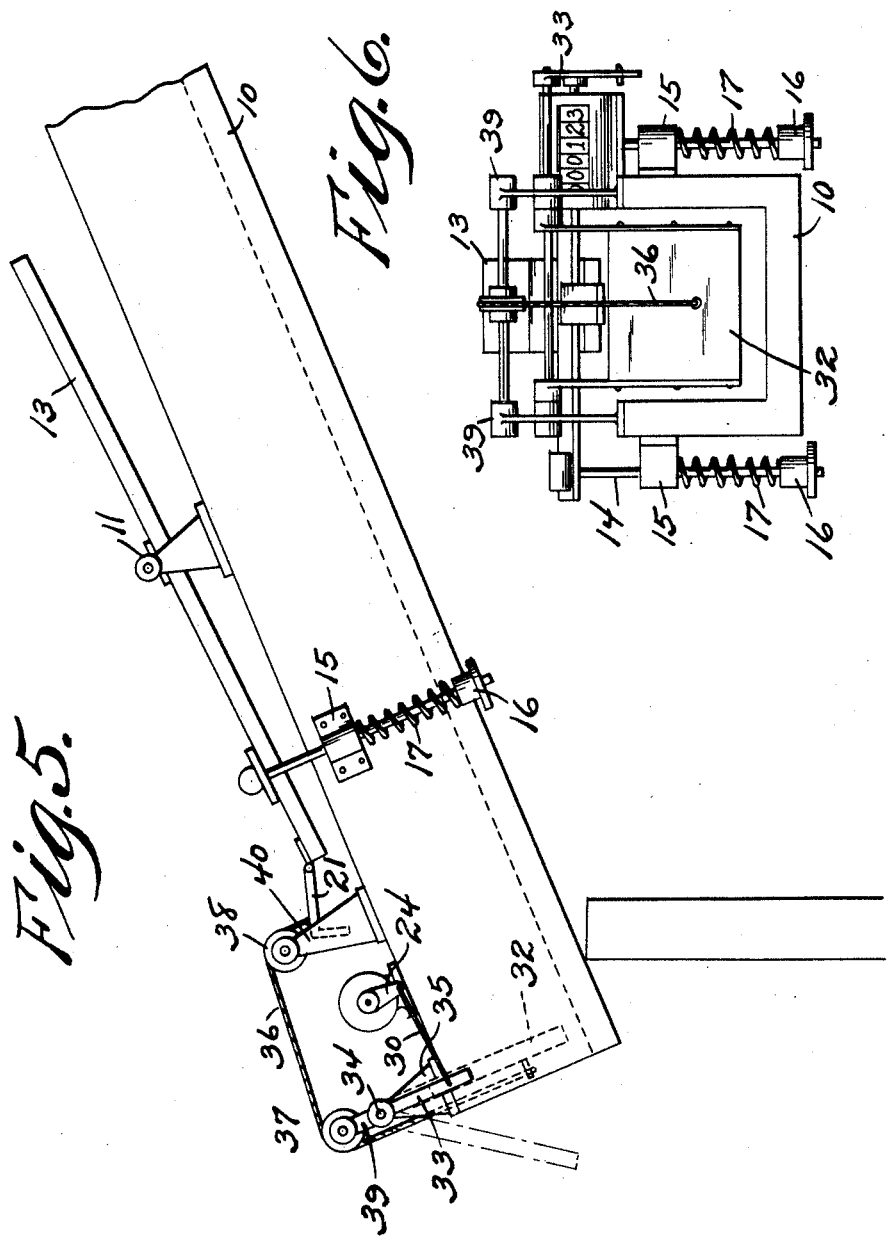
Howard Armstrong
INVENTOR
BY Victor J. Evans
ATTORNEY
WITNESS Patented Jan. 4, 1927.

1,613,552

UNITED STATES PATENT OFFICE.

HOWARD ARMSTRONG, OF HUMBERSTONE, ONTARIO, CANADA.

BAG OR SACK COUNTER.

Application filed August 5, 1925. Serial No. 48,327.

This invention relates to counter actuating devices and has for its object the provision of a novel mechanism designed to be mounted upon and used in connection with a loading or discharge chute or conveyor capable of actuating means for counting the number of bags passing along the chute.

An object of the invention is to provide a mechanism of this character embodying or including means for checking and slowing up the speed of the bags as they pass along the chute so that danger to the parts of the mechanism will be avoided.

Yet another object is the provision of a mechanism of this character embodying counter operating means and temporary retaining means, the two acting in alternation and the latter being operated by movement of the former.

Another object is to provide a device of this character which will be comparatively simple and inexpensive in manufacture, adjustable to meet different conditions such as variations in the size of the bags or sacks, which will be efficient and automatic in operation, durable in service, and a general improvement in the art.

With the above and other objects and advantages in view, the invention consists in the details of construction and the arrangement and combination of parts to be hereinafter more fully described and claimed, and illustrated in the accompanying drawings, in which:

Figure 1 is a side elevation of the device showing the parts in one position.

Figure 2 is a similar view showing the counter as being actuated by the passage of a bag.

Figure 3 is a plan view.

Figure 4 is a front elevation.

Figure 5 is a side view of a modification, and

Figure 6 is an end elevation thereof.

Referring more particularly to the drawings, the numeral 10 designates a discharge chute of any desired construction, which chute may form part of an apparatus for loading bags of material into wagons, upon a loading platform, into a car, ship or the like. The bags, designated by the letter A, of course pass along this chute so as to be discharged into or onto the desired location in a well known manner. Mounted on the sides of the chute 10 are upstanding bearing members 11 within which is journaled a shaft 12 carrying a rockable presser member 13 adapted to be engaged by the successive bags passing down the chute so as to check them and insure proper operation of the mechanism to be described. At its forward end portion, this presser member 13 carries depending rods 14 slidable through guide brackets 15 on the sides of the chute and equipped with adjustable nut members 16 bearing against compression springs 17 which operate to urge the forward end of the presser member downwardly while permitting it to yield as will be explained. Obviously, the nut members 16 are adjustable so that the tension of the springs 17 may be varied depending upon the size of the bags. The natural position of the presser member 13 is such that the rear end thereof will be considerably higher with respect to the bottom of the chute than the forward end so that the bags sliding down the chute may freely pass beneath the rear or higher end but be checked at some intermediate point. To prevent jamming of the bags at this point it may be preferable to provide a conveyor chain 18 located in the bottom of the chute and trained about sprockets or rollers 19, one of which may be driven in any desired manner so as to effect driving movement of the conveyor. Pivoted upon the forward or lower end of the presser member 13, as shown at 20 is an angular retaining member 21 adapted to be swung downwardly and to extend into obstructing relation to the path of movement of the bags so as to hold them temporarily stationary for a reason to be explained. Mounted on the lower end of the chute are upstanding brackets 22 upon which is vertically adjustably pivotally mounted, at 23, an angular arm 24 which has one end connected by a flexible member 25 with the angular retaining member 21 and which has its other end carrying a ball 26 located in the path of movement of the bags. Also carried by the chute at the lower portion thereof is an upstanding support 27 upon which is mounted a counting device 28 of any ordinary or preferred type having an operating arm 29 with which is pivotally connected a rod 30 which is adjustably connected with an arm 31 on the intermediate portion of the rocking member 24.

The normal position of the parts is shown in Figure 1. In the operation, it will be seen that the bags A sliding down the chute 10 will pass freely under the rear or upper end of the presser member 13 and then as they descend farther along the chute they will engage against the lower portion thereof, their speed being consequently greatly retarded owing to the spring pressure exerted on the presser member 13. The conveyor chain structure 18 will operate to prevent the bags from becoming jammed at this point, as will be readily apparent. The first bag passing through or beneath the presser member 13 will, upon reaching the end of the chute, strike against the ball 26 and consequently rock the angular arm member 24 upon its pivot 23, the rod 30 moving the arm 29 of the counter device and effecting operation thereof. When the arm member 24 is thus moved, it is apparent that the retaining member 21 will be permitted to drop into its lowered position as shown in Figure 2 in the path of movement of the next successive bag so that this bag will be held and be prevented from following the first bag too closely. As soon as the first bag has passed through or beyond the end of the chute the ball 26 will return to normal condition or position and the flexible member 25 will lift the retaining member 21 into elevated position so that the next successive bag may pass through and engage the ball for operating the counting mechanism. This step by step movement will be most efficient in preventing the bags from following one another so closely as to prevent proper operation of the counting mechanism though the time interval involved is only a small one and merely sufficient to permit the arm member to move up and down properly to actuate the counter.

In case the device is intended for use in connection with bags of widely different sizes, the minimum or smaller sizes being such that there is danger that the bags might not strike against such a ball member 26 to effect operation of the counter, use may be made of the modified structure shown in Figures 5 and 6. Referring to these figures it will be seen that the general construction and arrangement is substantially the same but that the angular arm and ball member is replaced by a pivotally mounted gate 32 which almost closes the chute and which is hung on suitable hangers 33 carried by a transverse shaft 34 suitably mounted above the chute as for instance by means of brackets 35. Connected with the lower portion of the gate is a flexible member 36 trained over guide pulleys 37 and 38 journaled in suitable brackets 39 and 40 respectively, and connected with the retaining member 21.

The operation of this second described form is substantially the same as that of the first form except that the flexible member 36 connected with the gate will automatically actuate the retaining member 21 for checking the bags and spacing them apart to the necessary extent as they descend the chute.

From the foregoing description and a study of the drawings, it will be apparent that I have thus provided a simply constructed, inexpensive and highly efficient counting device for the purpose specified, which will be a great saver of time and labor especially as it renders it unnecessary to employ a checker or tally man for the purpose of keeping accurate count of the bags. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. A chute adapted to have bags of material moved therealong, a spring pressed presser member mounted above the chute and engageable by the bags for checking the descent thereof, a pivoted member at the lower end of the chute located in the path of travel of the bags and movable upon engagement thereby, and means engageable by the successive bags for holding them back and spacing them one from another.

2. A chute adapted to have bags of material moved therealong, a spring pressed presser member mounted above the chute and engageable by the bags for checking the descent thereof, a pivoted member at the lower end of the chute located in the path of travel of the bags and movable upon engagement thereby, and a driven conveyor mounted in the bottom of the chute for carrying the bags past and beyond said presser member.

3. In an apparatus of the character described, a bag loading chute, a spring pressed member mounted thereabove in position to be engaged by the bags for checking their descent, a movably mounted member located in the path of movement of the bags, and an angular retaining member pivotally mounted at the lower end of said presser member and controlled by movement of said movable member whereby to space the successive bags apart.

4. In an article loading chute, a spring pressed member mounted thereabove in position to be engaged by the articles for checking their descent, means for varying the spring tension on said member, a movably mounted element located in the path of travel of the articles, a feed conveyor located in the bottom of the chute to prevent jamming beneath said first named member, and an angular retaining member pivoted on said first named member and flexibly connected with said movable element whereby to be controlled thereby for spacing the successive articles apart.

In testimony whereof I affix my signature.

HOWARD ARMSTRONG.